6 Sheets—Sheet 1.

W. D'A. MANN.
Sleeping-Car.

No. 198,991. Patented Jan. 8, 1878.

WITNESSES
Chas J Gooch
Le Blond Burdett

INVENTOR
Wm D'Alton Mann
By Knight Bros Attorneys

6 Sheets—Sheet 2.

W. D'A. MANN.
Sleeping-Car.

No. 198,991. Patented Jan. 8, 1878.

WITNESSES
Chas J Gooch
LeBlond Burdett

INVENTOR
Wm D'Alton Mann
By Knight Bros. Attorneys

N. PETERS, PHOTO-LITHOGRAPHER, WASHINGTON, D.C.

6 Sheets—Sheet 4.

W. D'A. MANN.
Sleeping-Car.

No. 198,991. Patented Jan. 8, 1878.

WITNESSES
Chas J Gooch
L Blond Burdett

INVENTOR
Wm d'Alton Mann
By Knight&co Attorneys

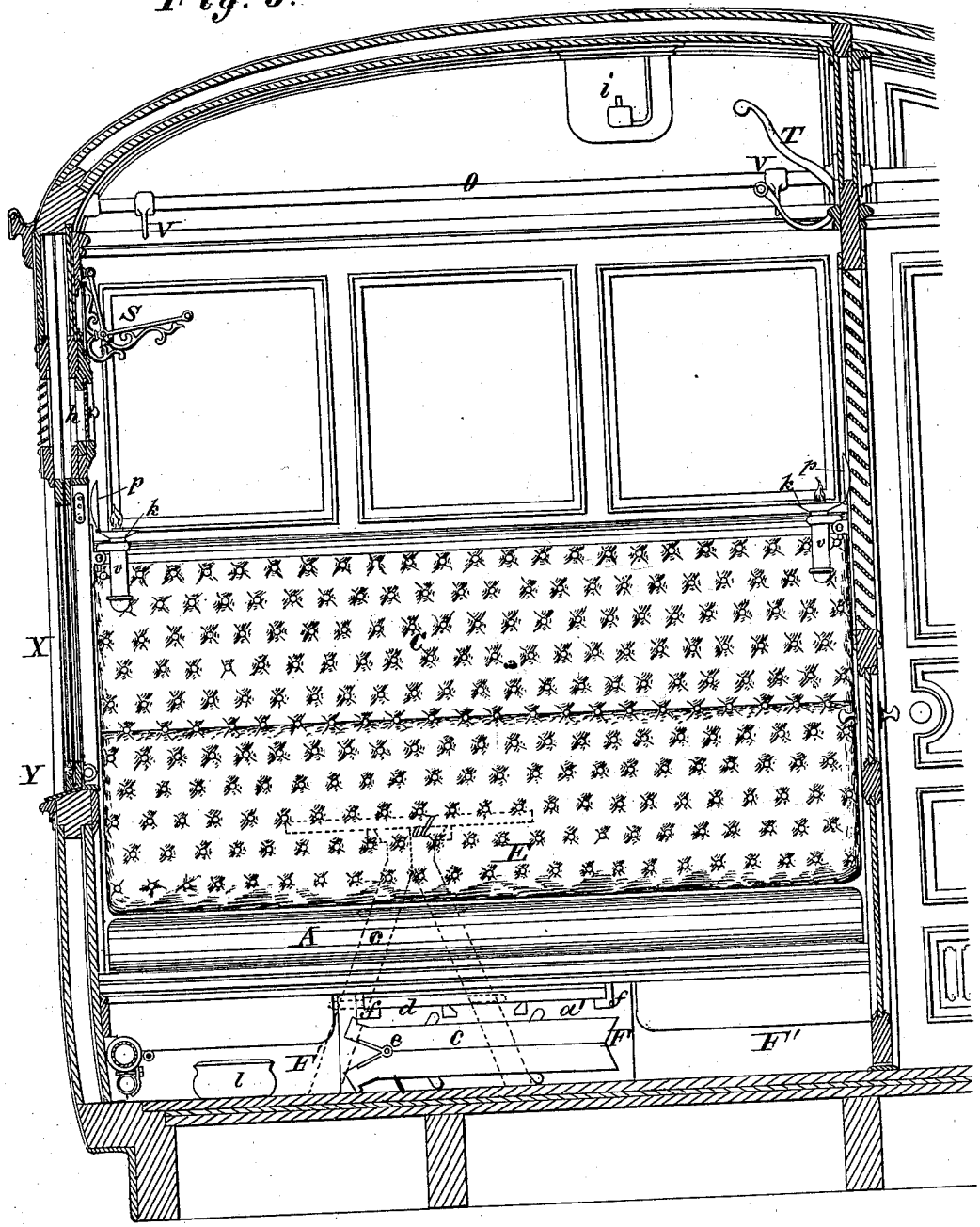

6 Sheets—Sheet 6.
W. D'A. MANN.
Sleeping-Car.
No. 198,991. Patented Jan. 8, 1878.
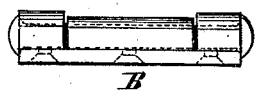
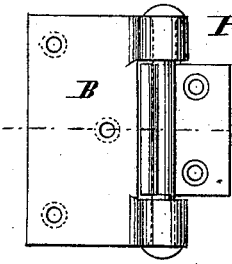
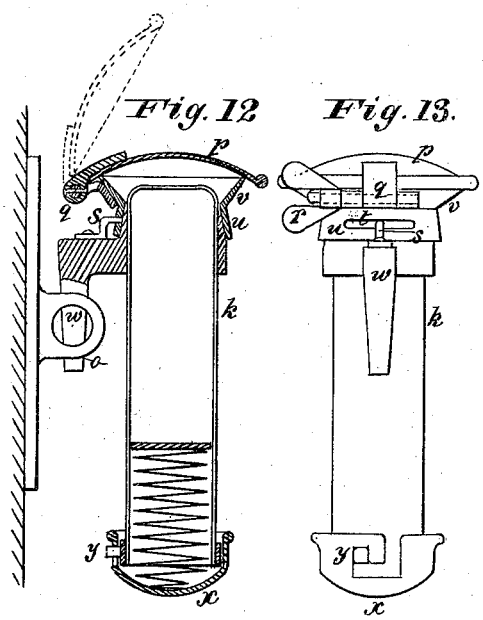
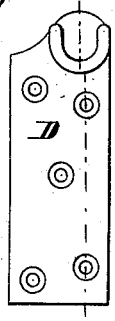
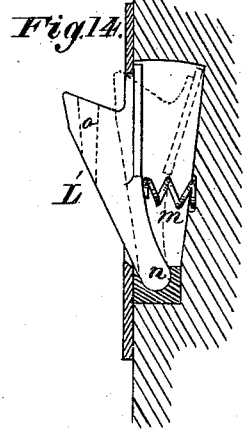
WITNESSES
Chas L Gooch
Leyland Burdett
INVENTOR
Wm. D'Alton Mann
By Knight Bro. Attorneys
N. PETERS, PHOTO-LITHOGRAPHER, WASHINGTON, D. C.

UNITED STATES PATENT OFFICE.

WILLIAM D'ALTON MANN, OF MOBILE, ALABAMA.

IMPROVEMENT IN SLEEPING-CARS.

Specification forming part of Letters Patent No. 198,991, dated January 8, 1878; application filed May 26, 1877.

*To all whom it may concern:*

Be it known that I, WILLIAM D'ALTON MANN, of Mobile, in the county of Mobile and State of Alabama, have invented certain Improvements in Saloon and Sleeping Cars, applicable also to ships' cabins, of which the following is a specification:

My invention consists, in part, in constructing a railway-car with a closed platform at the ends, and with a longitudinal corridor at one side communicating with side rooms fitted with transverse couches, as hereinafter set forth.

The invention further consists in providing a hinged upper couch with a reversible flap, adapted, when in horizontal position, to impart a flat cushion surface to the couch, and when lowered to supplement the width of the couch in providing a back for the lower couch when the latter is to be used as a seat.

My invention further consists in a hinged lower couch, having a supporting-box beneath it, constructed with compartments for the mattresses and pillows, and leaving a space for the reception of the step-ladder and table-top when not in use.

The invention further consists in constructing the couch-supporting catches with sockets for the reception of lamps when the couches are not in use.

Figure 1:
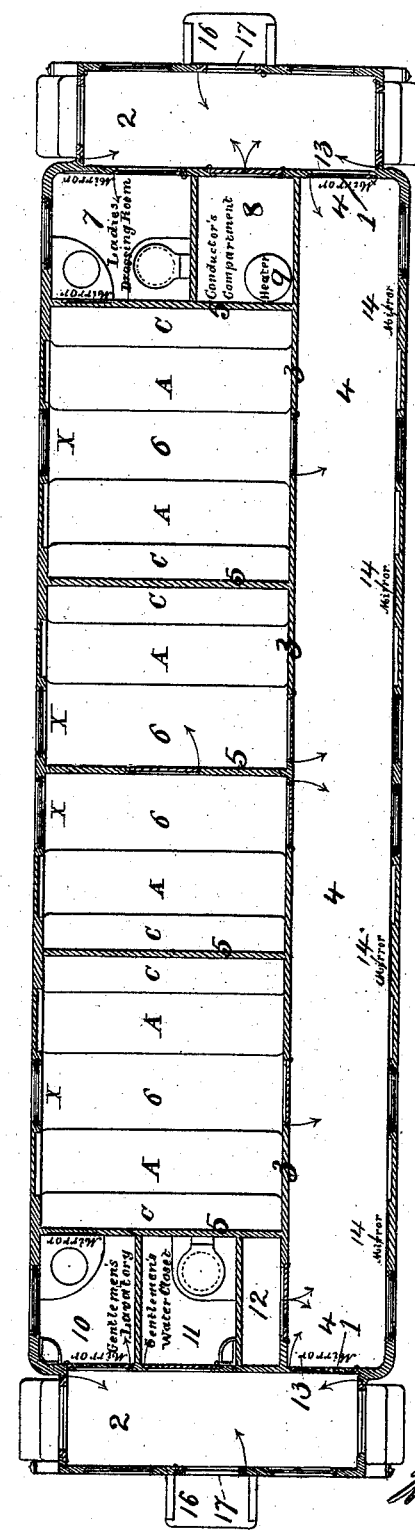
Figure 2:
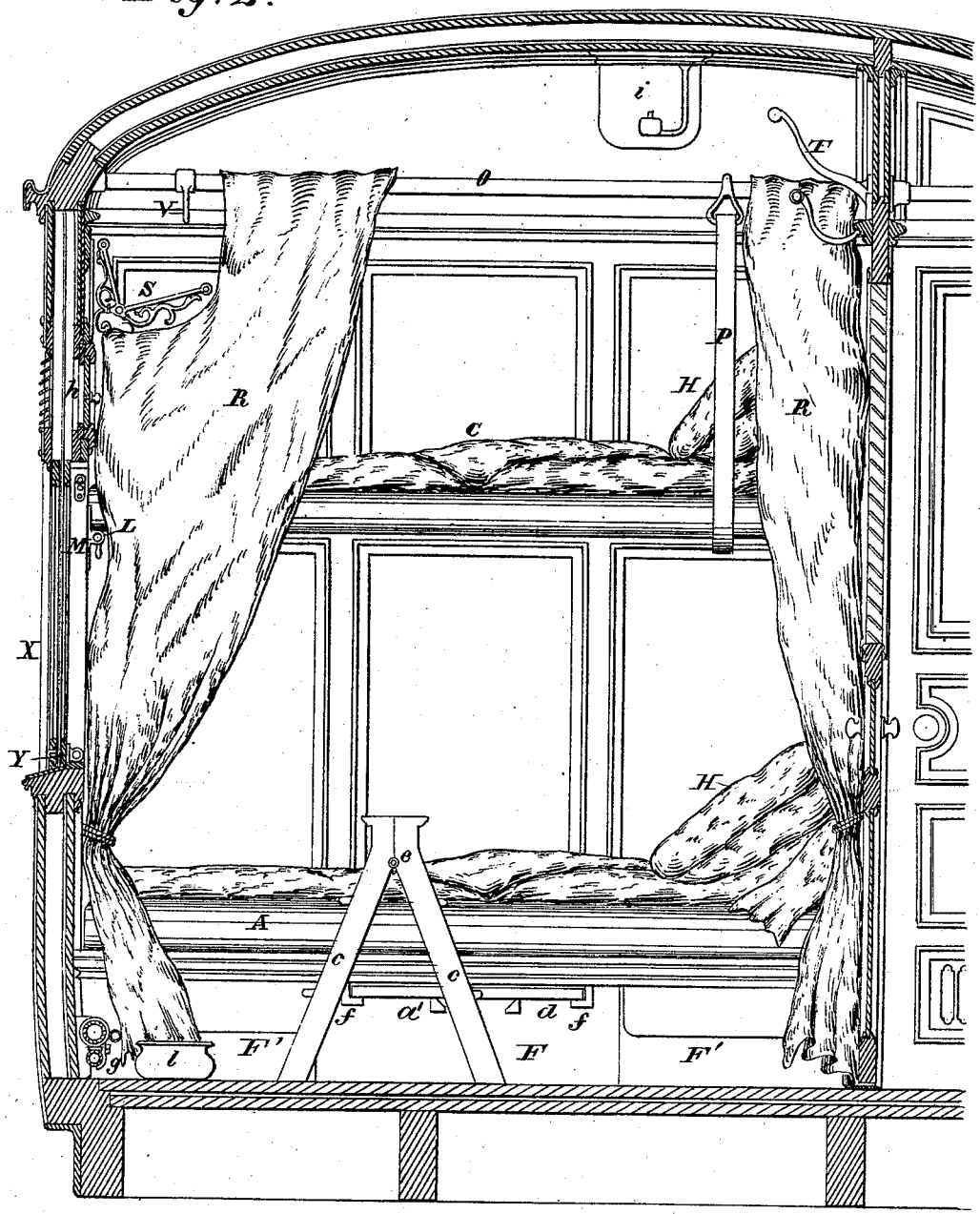
Figure 3:
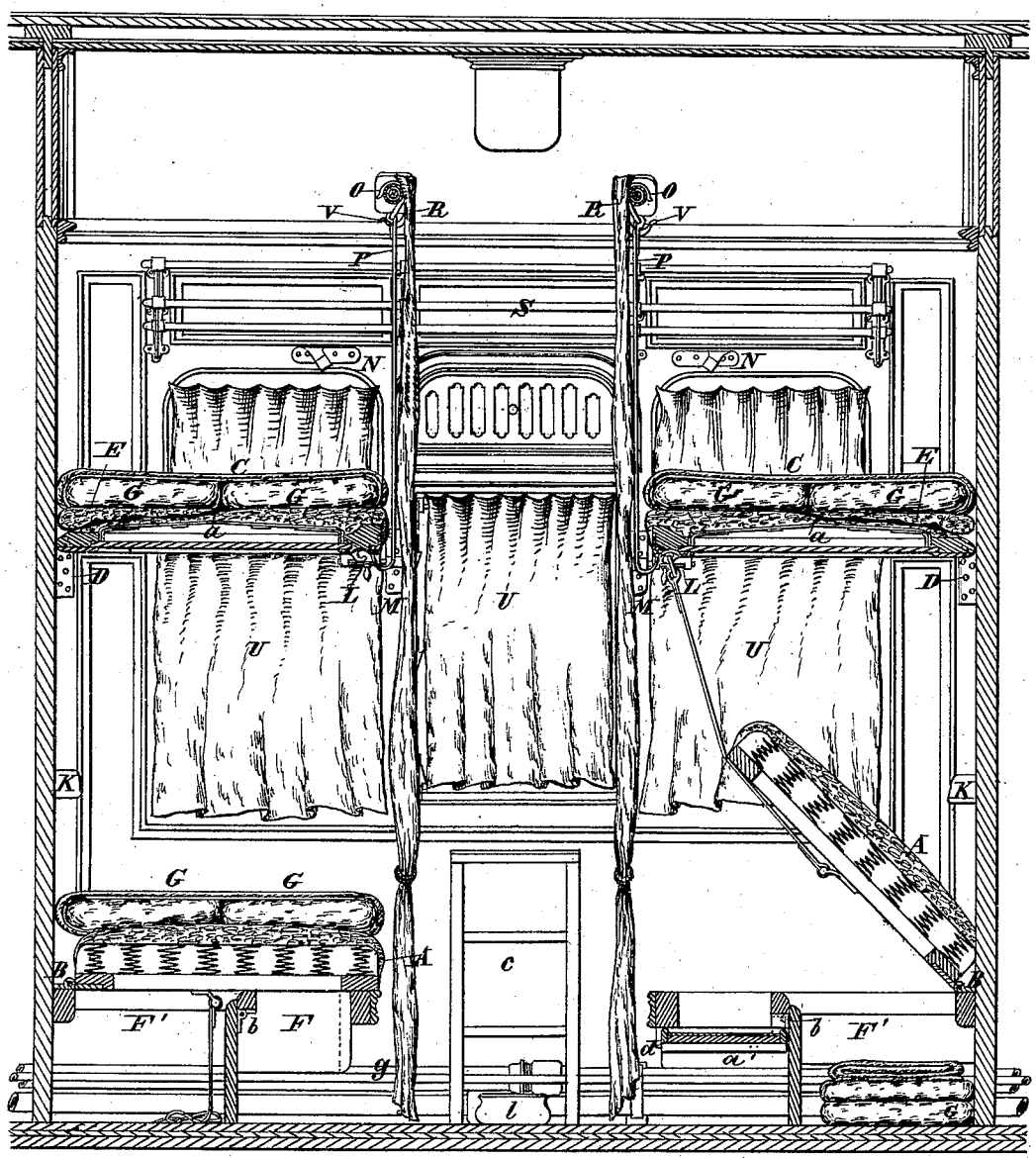
Figure 4:
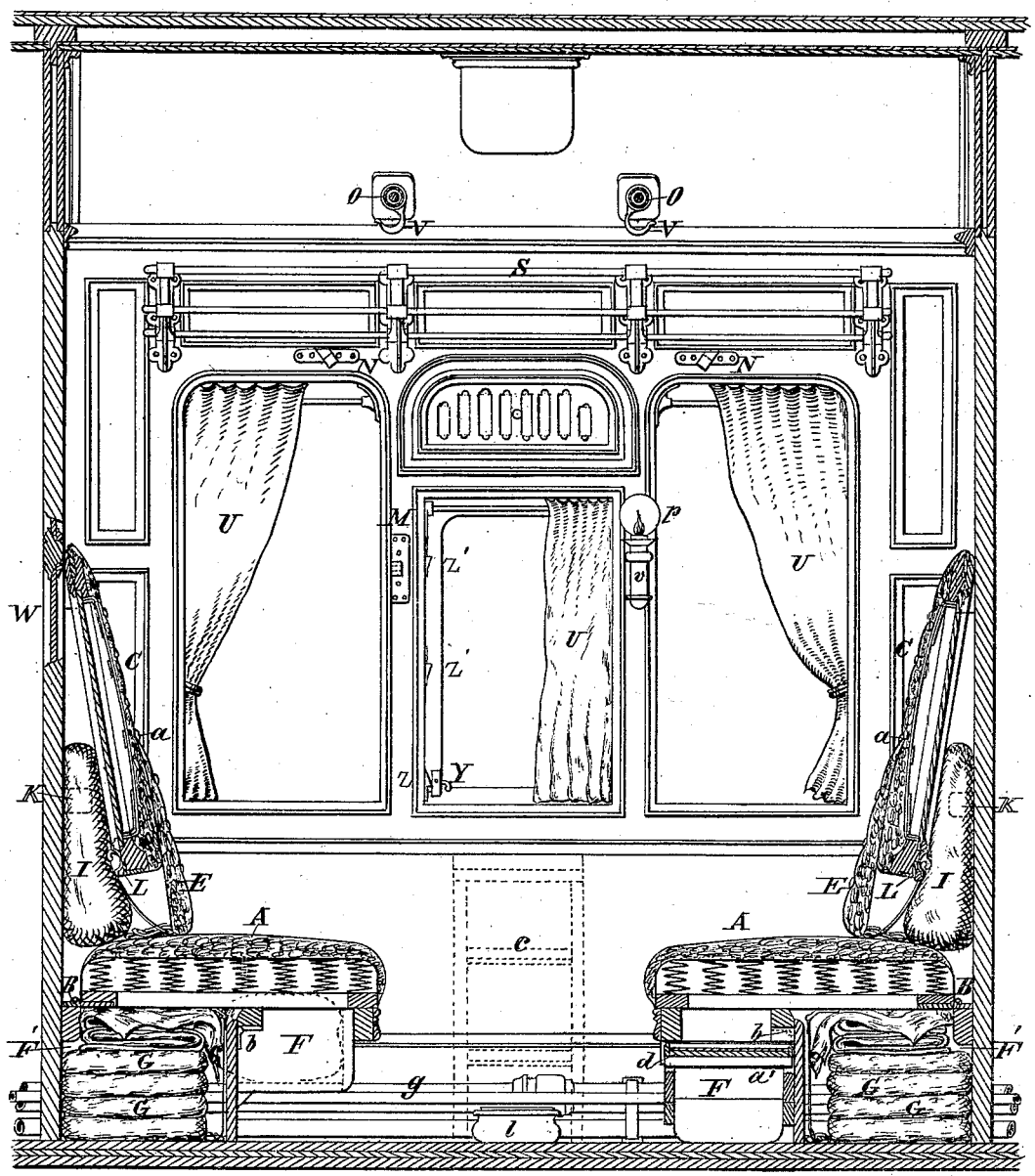

In the accompanying drawing, Figure 1 is a horizontal section or plan of a convertible sleeping and day car, illustrating my invention, the interior fittings being, in part, omitted. Fig. 2 is a transverse section of a portion of the car on a larger scale, showing the couches arranged for sleeping. Fig. 3 is a longitudinal section of a portion of the same, as arranged for sleeping, one of the lower couches being raised to give access to the receptacle below it. Fig. 4 is a longitudinal section of a part of the car, showing the couches arranged to serve as seats for day use. Fig. 5 is a transverse section of a portion of the car with the seat arranged for day use. Figs. 6, 7, and 8 are, respectively, a transverse section, a front elevation, and a top view of a separable hinge for the lower couch. Figs. 9, 10, and 11 are, respectively, a front elevation, a vertical section, and a top view of a hinged socket for the upper couch. Fig. 12 is a vertical section of a detachable lamp, and an elevation of its supporting-bracket, which serves, also, as a socket for locking the bolt at the outer edge of the upper couch. Fig. 13 is an elevation of the detachable lamp. Fig. 14 is a vertical section of a self-acting springcatch for supporting the outer edge of the upper couch. Fig. 15 is a front elevation of the same.

In Fig. 1, I represent a car whose platforms are inclosed so as to form halls or passages 2 2. 3 is a partition, extending the whole length of the car-body, and forming a corridor, 4, on one side thereof. 5 are transverse partitions, adapted to form, with the longitudinal partition 3, single or double rooms 6.

The end rooms are subdivided, so as to provide at one end of the car a ladies' dressing-room, 7, and conductors' compartment 8, provided with a suitable heater, 9, and at the other end of the car a gentlemen's lavatory, 10, gentlemen's water-closet 11, and baggage and linen room 12. At each end of the corridor 4 are doors 13. Communication is had through halls 2 with the end rooms.

The ordinary passage-ways are thus utilized, and the entrances to the end rooms isolated from the state-rooms, as the said entrances are located on the platforms, excepting the entrance to the baggage and linen room. The entrance to the baggage and linen room is in the main corridor, so that any articles in charge of the attendant may be safely deposited and readily obtained without leaving the corridor.

I prefer to provide the end doors of the corridor with mirrors 11. 15 are doors, by which communication may be had with other cars over extension-platforms 16. 17 17 are doors leading to the steps from the hallways 2 2.

Along the outer side of the corridor 4 I place mirrors 14, to add to the appearance of the car.

A A are the couches, seats, or sofas properly supported at the front, and hinged at the back by hinges B B, which are, by preference, so constructed as to permit of the seat being easily removed when found desirable. One of these hinges is shown in detail section, front view and plan, at Figs. 6, 7, and 8, Sheet 6.

C C are upper couches, beds, berths, sofas, or upholstered frames, also attached to transverse partitions of the compartment by other hinges at D D, constructed in a similar way to the hinges B B, so as to enable the said beds to be readily removed or detached and disposed at a suitable height from the floor.

Figs. 9, 10, and 11, Sheet 6, represent a detail elevation, section, and plan of one of the sockets for the hinge-pins of these hinges. These beds or upholstered frames are designed to form, at will and according to their positions, the backs of the sofas A A, as shown in Fig. 1, and beds or berths, as shown in Fig. 4.

E E are soft cushions, in the form of long sacks, attached, by a flexible joint at $a$, to the beds C C, at the proper point, to permit them to complete the formation of a comfortable and well-shaped back for the sofas A A, as shown in Fig. 4, or reversed to complete and give a level surface to the beds C C, as shown in Fig. 3.

F F are the long boxes, cases, or lockers, having a compartment, F′, at each end projecting to the front, constructed under the seats or sofas A A, for containing the mattresses, pillows, blankets, and curtains necessary to make up two complete beds. The middle portion of the front of the box is hinged at $b$, to render the interior more accessible for being cleaned.

G G are the mattresses, made with longitudinal flexible joints, for the convenience of folding. H H are the pillows; I I, suitable bolsters for the beds, two of which are placed behind each sofa-back C during the day, so as to form an elastic support for the same, as is clearly shown in Fig. 4. K K are elastic safety-buffers, (shown dotted in Fig. 4,) attached to the transverse partitions at each end, for the purpose of supporting the couch C in the absence of the bolsters I I. L L are the bolts attached to the beds, which, when the beds C C are in a horizontal position, are engaged with or slid into sockets in the brackets M M, one of which is placed on each side of the compartment for each couch, as shown clearly in Fig. 3. L′, Figs. 14 and 15, Sheet 6, is a detail section and elevation of the particular form of self-acting catch, which I prefer to employ in lieu of the sliding bolts, one of each of which catches is fitted to the side of the compartment, close to the outside edge of each bed, and in such a way that in lifting the upper bed into a horizontal position the inclined and hinged catches L′ are forced back into the partition, but immediately the bed is clear above them they fall or are pushed out again by the action of a spring, $m$, when the bed may be securely rested on them. The catches turn on knuckle-joints at $n$, and the springs $m$ serve to prevent rattling of the catches when traveling. $o$ is the socket for receiving the hook of the reading-lamp when required. N N are other sockets or brackets, provided on both sides of the compartment into which the sliding bolts L may also engage, with a view to supporting the beds C C in a conveniently-elevated position when not in use; or the said sockets may be replaced by the self-acting catches L′. O O are the strong rods which are placed transversely in the compartment at a suitable height and position for supporting the curtains required for screening the beds at night. In practice, it is found that cords suspended from the roof and sides are preferable. P P, Figs. 2 and 3, are the strong safety-straps which are attached to the bottom near each end of the couches C C, and provided with strong hooks at the extremity, for attachment to the curtain rods or cords O O when the couches are secured in the brackets M or N. Q Q are other straps, which may be used by attaching them to a suitable hook in the upper couches C C, when in a horizontal position, for holding up the sofas or couches A A in a convenient position to enable the mattresses, blankets, and bedding appurtenances to be easily withdrawn from the boxes or lockers F F′ when making up the beds for the night. R R are the bed-curtains, provided with hooks for attaching them, when required for use, to the curtain rods or cords O O. S is the baggage-rack, placed longitudinally over the windows of the compartment. T is a large double hook, four of which are so placed as to form, with their lower parts, a rack for umbrellas and walking-sticks, while the upper parts form hat-hooks. U U are the window-curtains, also provided with hooks for attaching them to fixed curtain rods or cords of their own, and enabling them to be removed with facility, for cleaning. V V are strong hooks attached to the rods or cords O O, for holding the clothing of the passengers. W W are fixed windows in the side of the compartment and corridor when the carriage is constructed with a corridor.

X X are movable windows, which may be made with double frames, both frames being fitted with glasses, or one of the frames with wire-gauze. Y is a lock or fastening, with bolt and lever for securing the window X when closed, or for sustaining it in different positions of elevation or opening by allowing the bolt in the former case to project under an inverted bracket, Z, or to rest on the brackets or projections Z′ (see Fig. 4) when the window is more or less open. $c$ is the step-ladder for facilitating access to the upper beds C C, while it also forms a support for the table-top $d$. This step-ladder is jointed or hinged at $e$, to enable it to be shut up, and, when not in use, to be stowed away under the middle of the seat A in a space, $a'$, between the projecting ends of the boxes or lockers. (See Fig. 5.)

The table-top $d$ is so constructed as to fit securely, when required for use, on the top of the ladder $c$. When out of use, it is placed in the rack $f$, or properly-inclined support under the seat.

$g\ g$ are the heating-pipes for conveying hot water or steam, should such systems be used for warming the carriage. $h$ is the ventilator; $i$, the carriage-lamp. $k$ is the reading-lamp, fitted in its bracket; and $l$ is the spittoon.

Figs. 12 and 13, Sheet 6, represent, respectively, an enlarged section and elevation of the reading-lamp. This lamp is made to burn candles, and has a reflector, $p$, so hinged at $q$ that it can be inclined upward or downward or turned horizontally around the top of the lamp to the position most suitable for reading. A set-screw, $r$, is provided, which securely holds it at any vertical angle required, while the fixed pin $s$, engaging in a slot, $t$, in the collar $u$ of the grease-cup $v$, which carries the reflector, prevents its accidental displacement. The cup $v$ serves to catch any grease that might drop.

$w$ is the hook of the lamp, which fits into a socket-hole made either in one of the sliding-bolt sockets (see Fig. 12) or in the self-acting catch at $o$, Figs. 14 and 15, or in any special bracket or holder.

The bottom $x$ of the lamp, on which rests the spring for raising the candle, is held in position by a bayonet-fastening, $y$, in lieu of screw-threads, as heretofore, for greater convenience of removal and replacement.

It will be observed that I utilize the place occupied by ante-rooms in cars as previously constructed, and use the car-platforms as ante-rooms. There is no direct communication between the dressing-rooms and the state-rooms, as the dressing-rooms are reached by passing out of the corridor and out of sight of the state-rooms.

Having thus described my invention, the following is what I claim as new and desire to secure by Letters Patent:

1. A car constructed with state-rooms on one side thereof, and having a corridor on the other side thereof, the whole length of the car-body, communicating directly with inclosed platforms, as and for the purpose set forth.

2. A car constructed with rooms 6, longitudinal corridor 4 on one side thereof, and the end rooms 7 8 10 11, having communication with the platforms only, as and for the purpose set forth.

3. The hinged upper couch, forming, when lowered, an inclined back, and constructed with a reversible flap, completing, in one position, the inclined and cushioned back, and in the other position imparting a level surface to the upper couch, when the latter is supported horizontally, as described.

4. The hinged sofa-seat A, having a supporting-box, F, beneath it, constructed with compartments F' F', leaving a space, $a$, as and for the purpose set forth.

5. The couch-supporting catches L', constructed with sockets for the reception of lamps when the couches are not in use.

In testimony of which invention I hereunto set my hand this 23d day of November, 1876.

WILLIAM D'ALTON MANN.

Witnesses:
  OCTAVIUS KNIGHT,
  CHAS. J. GOOCH.